(12) United States Patent
Honegger

(10) Patent No.: US 9,782,954 B2
(45) Date of Patent: Oct. 10, 2017

(54) METHOD FOR ASSEMBLING A STACK OR A COLLECTION CONSISTING OF SINGLE OR MULTILAYERED PRE-PRODUCTS THAT LIE FREELY ONE ON TOP OF THE OTHER, COMPOSITIONS OF SUCH PRE-PRODUCTS, AND APPLICATOR FOR PRODUCING SUCH COMPOSITIONS

(71) Applicant: FERAG AG, Hinwil (CH)

(72) Inventor: Werner Honegger, Baech (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 15/260,541

(22) Filed: Sep. 9, 2016

(65) Prior Publication Data
US 2017/0057203 A1    Mar. 2, 2017

Related U.S. Application Data

(63) Continuation of application No. 13/996,445, filed as application No. PCT/EP2011/071916 on Dec. 6, 2011, now Pat. No. 9,469,086.

(30) Foreign Application Priority Data

Dec. 20, 2010 (CH) ....................... 2121/10

(51) Int. Cl.
*B32B 7/12* (2006.01)
*B42C 9/00* (2006.01)
(Continued)

(52) U.S. Cl.
CPC .................. *B32B 7/12* (2013.01); *B32B 3/04* (2013.01); *B32B 37/1292* (2013.01); *B42B 5/00* (2013.01);
(Continued)

(58) Field of Classification Search
CPC ............ B42C 9/00; B42C 9/0056; B42C 1/04
(Continued)

(56) References Cited

U.S. PATENT DOCUMENTS 5,096,176 A    3/1992   Golicz et al.
5,632,476 A    5/1997   Stauber
(Continued)

FOREIGN PATENT DOCUMENTS

CH          461 248      10/1968
DE          G87 01 920   7/1988
(Continued)

*Primary Examiner* — Patrick Mackey
(74) *Attorney, Agent, or Firm* — Pauley Erickson & Kottis

(57) ABSTRACT

The invention relates to a method for assembling a stack (10) consisting of single or multilayered pre-products (1115) of equal or different sizes, said pre-products lying freely one on top of the other, wherein the stack (10) has two outer pre-products (11, 15). According to the method, the stack (10) is given a cohesion that facilitates later handling. The cohesion is achieved in a very simple and flexibly applicable manner by providing the slack (10) to be assembled in a first step, said stack consisting of pre-products (11-15) that lie freely one on top of the other, and by attaching at least one connecting element (17) to an edge (16) of the stack (10) in a second step such that said element overlaps the two outer pre-products (11, 15) of the stack (10) in a clamping manner.

20 Claims, 10 Drawing Sheets

(51) Int. Cl.
  *B65C 1/04* (2006.01)
  *B65H 37/04* (2006.01)
  *B65H 39/055* (2006.01)
  *B32B 3/04* (2006.01)
  *B42B 5/00* (2006.01)
  *B42B 5/04* (2006.01)
  *B42F 1/00* (2006.01)
  *B32B 37/12* (2006.01)
  *B65H 37/02* (2006.01)

(52) U.S. Cl.
  CPC .............. *B42B 5/04* (2013.01); *B42C 9/0056* (2013.01); *B42F 1/00* (2013.01); *B65C 1/042* (2013.01); *B65H 37/02* (2013.01); *B65H 37/04* (2013.01); *B65H 39/055* (2013.01); *B32B 2317/12* (2013.01); *B65H 2301/422* (2013.01); *B65H 2301/43821* (2013.01); *B65H 2701/1932* (2013.01); *Y10T 428/24331* (2015.01); *Y10T 428/24752* (2015.01)

(58) Field of Classification Search
  USPC ...................................................... 270/58.18
  See application file for complete search history.

(56) References Cited

U.S. PATENT DOCUMENTS

| | | | |
|---|---|---|---|
| 5,980,676 A * | 11/1999 | Meetze | ................ B42B 5/04 156/216 |
| 6,082,727 A | 7/2000 | Thompson | |
| 6,978,990 B2 | 12/2005 | Silverbrook | |
| 6,998,742 B2 | 2/2006 | Yamaguchi et al. | |
| 7,128,118 B2 | 10/2006 | Kramer et al. | |
| 7,451,796 B2 | 11/2008 | Hansch | |
| 7,611,135 B2 | 11/2009 | Kaya | |
| 2010/0194023 A1 | 8/2010 | Ozawa et al. | |
| 2013/0280484 A1 | 10/2013 | Honegger | |

FOREIGN PATENT DOCUMENTS

| | | | |
|---|---|---|---|
| DE | 692 14 614 T2 | 3/1997 | |
| EP | 0 266 454 A1 | 5/1988 | |
| EP | 0266454 A1 * | 5/1988 | ............... B42D 1/10 |
| EP | 0 666 186 A1 | 8/1995 | |
| EP | 1 516 839 A1 | 3/2005 | |
| WO | WO 2007/067325 A2 | 6/2007 | |

* cited by examiner

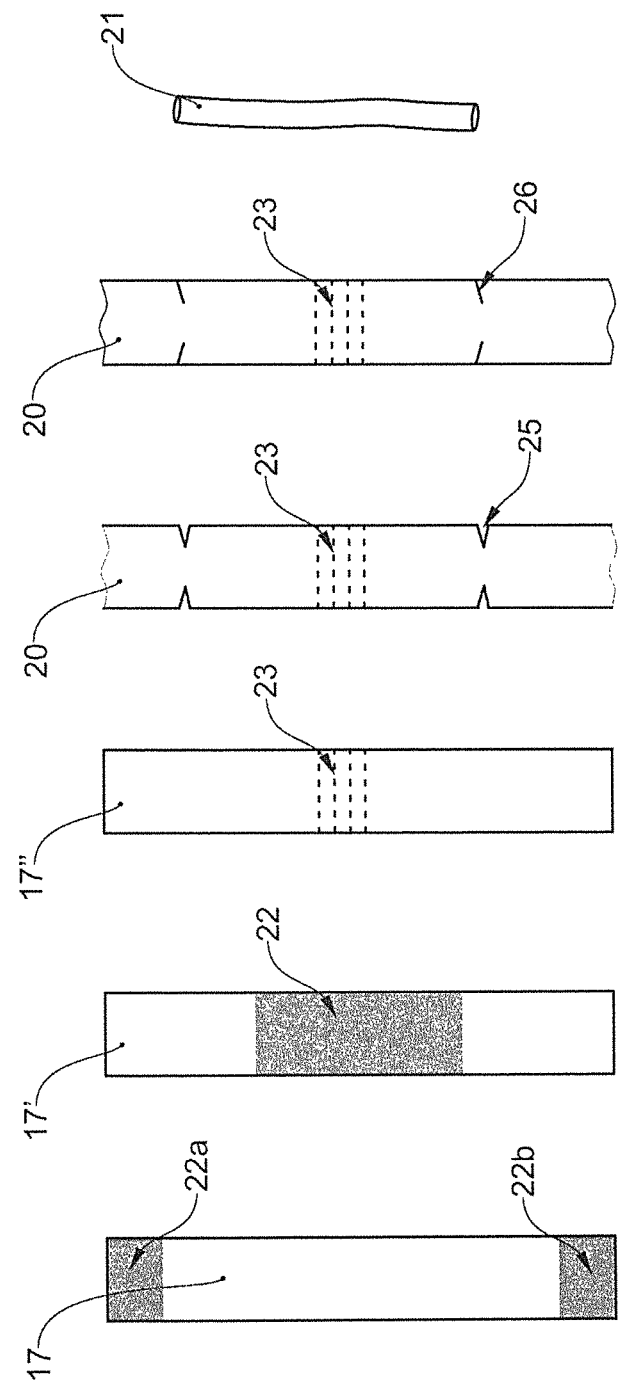

FIG. 6A
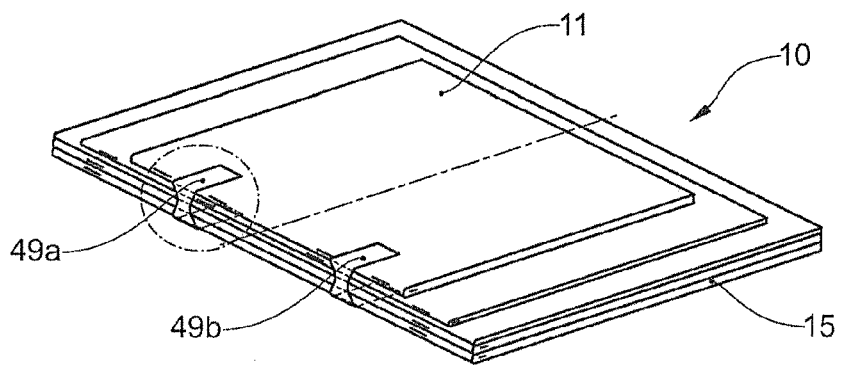
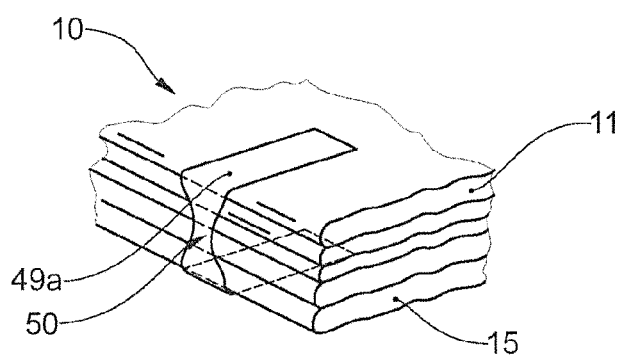
FIG. 6B
FIG. 7
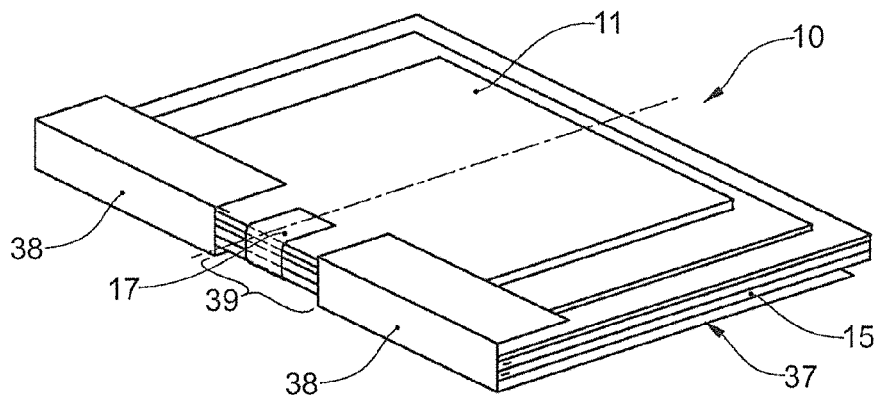

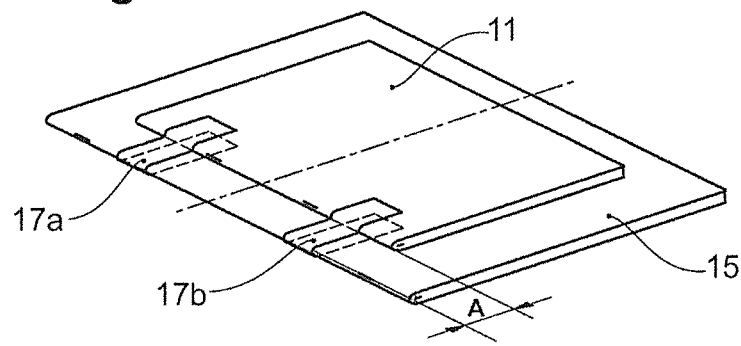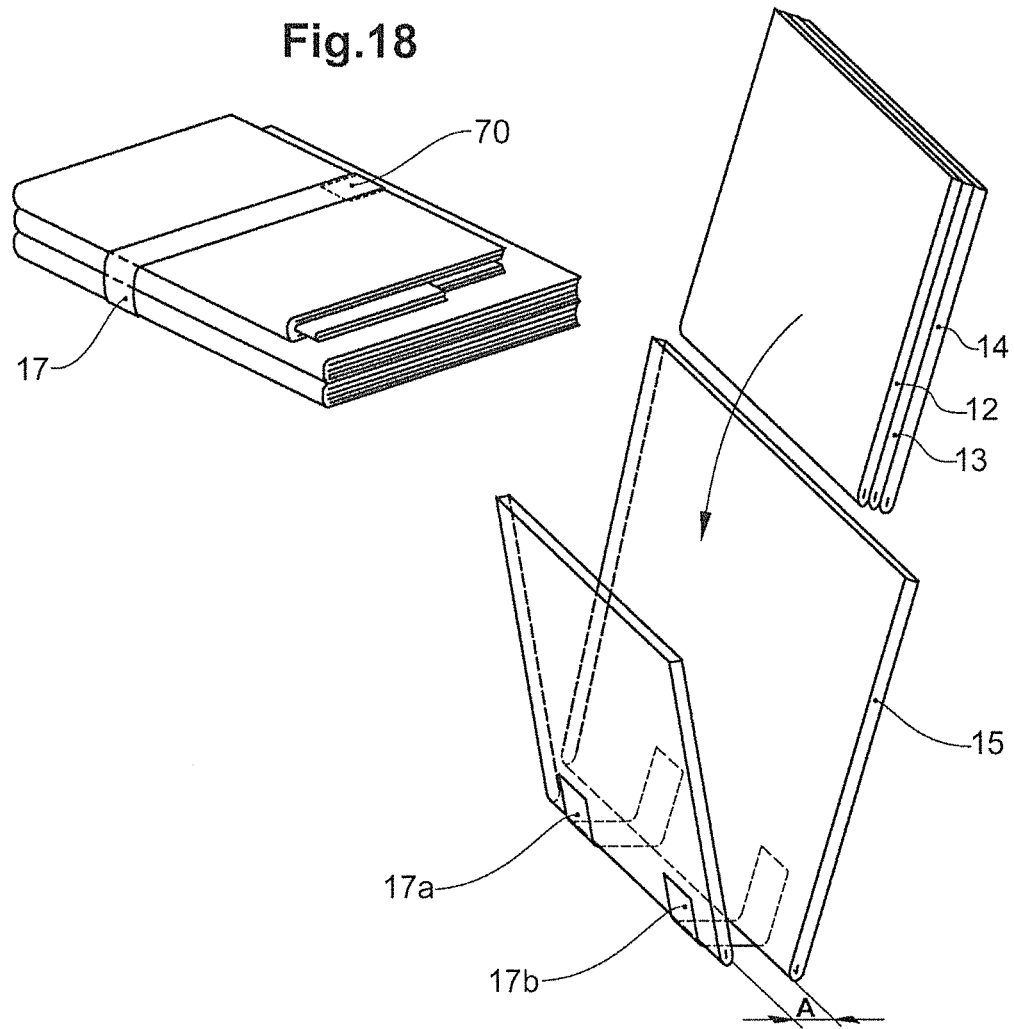

METHOD FOR ASSEMBLING A STACK OR A COLLECTION CONSISTING OF SINGLE OR MULTILAYERED PRE-PRODUCTS THAT LIE FREELY ONE ON TOP OF THE OTHER, COMPOSITIONS OF SUCH PRE-PRODUCTS, AND APPLICATOR FOR PRODUCING SUCH COMPOSITIONS

CROSS REFERENCE TO RELATED APPLICATION

This application is a continuation of U.S. application Ser. No. 13/996,445, filed on 20 Jun. 2013, which is a National Phase application of International Patent Application No. PCTEP2011071916, filed on 6 Dec. 2011. The co-pending parent application is hereby incorporated by reference herein in its entirety and is made a part hereof, including but not limited to those portions which specifically appear hereinafter.

BACKGROUND OF THE INVENTION

Field of the Invention

The present invention relates to the area of the further processing of pre-products (in particular printed products within the framework of the finishing process). It concerns a method for assembling a stack or a collection consisting of single-layered or multi-layered pre-products that lie freely one on top of the other. It also concerns compositions of such pre-products generated and an applicator.

Discussion of Related Art

Nowadays advertising means in the form of pre-products, such as brochures, flyers, catalogues, handouts, direct-mail advertising, but also product samples, CDs etc. are increasingly distributed directly by special services. In this case, advertising means from various suppliers are frequently combined and distributed together in order to keep the distributing costs down. The advertising means or pre-products distributed together then form a stack of (individual) separate copies which lie freely one on top of the other and have to be put together by hand by the distributor in each case at the site of the delivery. This type of composition, however, is time-consuming and susceptible to errors such that either certain advertising means are included several times in the formed stacks or are omitted completely.

The term stacks refers here, in principle, to compositions of pre-products which lie one on top of the other and are held together by the force of gravity. If the pre-products are aligned in another spatial orientation, for example lying vertically side by side, they are referred to here as a collection. The invention relates to such different types of compositions of pre-products.

However, it is also conceivable for the stacks consisting of pre-products to be formed at a central location and then supplied for distribution. In this case, during distribution the pre-products can easily slip inside the stack or the stacks can become mixed up if no specific measures are taken to hold the individual stacks together and to define them in relation to one another.

Thus it is possible, for example, to provide the formed stack consisting of advertising means or pre-products with a welded foil wrapping to hold the stack together and to define it in relation to other stacks. Such additional packaging of the stack simplifies the distribution considerably, however causes relevant additional expenditure and, where applicable, is unwanted from an ecological viewpoint. Over and above this, the welded foil bags can only be opened by the final consumer in a laborious manner and the overall impression is not particularly aesthetic depending on the material.

However, the stacks can also be strapped or bundled in another manner, for example by means of a covering. Thus, it would be possible, for example, to combine the stack of pre-products with a wrapper as is known, for example, from document CH 461 248. In this respect, however, to a great extent the same disadvantages as mentioned above are produced.

In addition, it is known from document EP 0 666 186 A1 to insert pre-products into a folded newspaper which then functions as a covering for the inserted pre-products and is subsequently closed by means of one or several adhesive strips (see also WO 2007/067325 A2). To this end, either the preparation of a newspaper is necessary or the preparation of a separate covering which, in turn, increases expenditure considerably.

Finally, it is known (U.S. Pat. No. 5,096,176) to separate individual part stacks of sheets from other part stacks in a larger overall stack by placing non-adhesive paper strips (columns 1, lines 58-62) as separating strips around an edge of the respective part stack. This is to prevent displacement of the separating strips, which otherwise are placed flatly between two part stacks. Said type of non-connecting separating strips is only suitable for the separation inside the overall stack as the separating strips immediately fall off if a part stack is conveyed as it is or is handled individually in any other manner.

SUMMARY OF THE INVENTION

It is, consequently, an object of the invention to provide a generic method which, in a particularly simple manner, makes possible the cohesion of a stack or of a collection consisting of single-layered or multi-layered pre-products of the same or different sizes that lie freely one on top of the other, in such a manner that the stack or the collection is able to be conveyed and handled as it is in a reliable manner and is able to be separated again easily into the individual pre-products.

In addition, it is an object of the invention to create corresponding compositions of such pre-products which can be easily handled and differentiated between. A further goal of the invention is to create such compositions in a cost-efficient manner.

It is finally an object of the invention to provide an applicator for producing such a composition.

The objects are achieved by claims 1 and 16.

The method as claimed in the invention for assembling a stack consisting of single-layered or multi-layered pre-products that lie freely one on top of the other or a collection consisting of single-layered or multi-layered pre-products that lie freely side by side, in particular printed products, of the same or a different size, which stack or which collection has two pre-products lying on the outside, during which method the stack or the collection is given a cohesion that facilitates the subsequent handling is characterized in that in a first step the pre-products associated with the stack or with the collection are prepared, and that in a second step at least one connecting element is mounted in such a manner that it overlaps the two outside pre-products of the stack or of the collection in an adhesive manner.

The term stacks here refers in principle to compositions of pre-products which lie one on top of the other and are held together by the force of gravity. If the pre-products are aligned in a different spatial orientation, for example lying vertically side by side, they are referred to here as a collection. The invention relates to such different types of compositions of pre-products.

With regard to the comprehension of the invention, it must be pointed out that, differently to the case of other adhesive connections of printed products, this one is oriented to the aforementioned pre-products within the framework of a continually running further processing operation or an overall logistic process. These form autonomous finished units both with regard to content and format which are re-used again individually and separately by the end consumer. Up to now in the prior art they have been handled individually within the framework of further processing.

In the case of a development of the method as claimed in the invention, in the first step the pre-products associated with the stack or with the collection are prepared in the form of the stack or of the collection. The stack or the collection, in this case, is already present in finished form when they are provided with the connecting element.

An alternative development is characterized in that in the second step only the two outside pre-products are connected and form an openable pocket, and that in a third step the remaining pre-products are inserted into the opened formed pocket to realize the stack or the collection. In this case, the complete stack or the complete collection is not produced until the connecting element has already been applied.

In principle, the connecting element can overlap the two outside pre-products on their outside or on their inside. A preferred development of the method as claimed in the invention is characterized in that the at least one connecting element overlaps the two outside pre-products of the stack or of the collection in an adhesive manner in each case on the outside. The mounting of the connecting element is simplified in this way.

If, as an alternative to this, the at least one connecting element overlaps the two outside pre-products of the stack or of the collection in an adhesive manner in each case on the inside, the appearance of the outside pre-products remains practically unimpaired. However, care must be taken to ensure that the connecting element has the necessary, sufficiently strong adhesive characteristics on the corresponding side.

Another development of the method as claimed in the invention is characterized in that the pre-products of the stack or of the collection each have at least one preferred edge, that the pre-products of the stack or of the collection are arranged and aligned in the stack or in the collection in such a manner that the preferred edges of the pre-products together form a stack edge, and that said stack edge is used for mounting the at least one connecting element.

Such edges at which the pre-products are folded and/or stitched and/or glued can be taken, in particular, as the preferred edges of the pre-products. If all the pre-products of the stack or of the collection have a folded edge, said pre-products can be stacked with the folded edges lying one on top of the other or lying side by side such that the stack edge, on which the connecting element is mounted, consists of just folded edges. However, it is also conceivable to arrange some of the pre-products with their folded edge on the opposite side in order to achieve a more uniform stack height.

As claimed in another development of the invention, several connecting elements are mounted longitudinally of the selected stack edge on the stack or on the collection overlapping the two outside pre-products of the stack or of the collection. As a result, expenditure is certainly increased, but the cohesion of the stack or of the collection is increased because shear forces, which cause the pre-products to rotate in the stack or in the collection-toward one another, can be better absorbed. This is advantageous in particular with a stack or a collection with many heavy and superficially smooth pre-products.

It is, however, also conceivable within the framework of the invention to mount several connecting elements on several selected stack edges on the stack or the collection overlapping the two outside pre-products of the stack or of the collection.

A development of the method as claimed in the invention is distinguished in that an adhesive strip is used as a connecting element. The term adhesive strip refers in this context to a strip of suitable material such as, for example, paper or plastic foil or plastic film which is provided at least on one side in part or totally with an adhesive layer. The adhesive strip is provided with such an adhesive layer at the positions where it overlaps the pre-products in an adhesive manner. In this case, a fugitive adhesive or peelable adhesive (peel glue), which, when the stack is subsequently taken apart, makes it possible to remove the connecting element or the adhesive strip in a simple manner, are considered here above all as the adhesive. Adhesive strips of paper are used in a preferred manner also for ecological reasons as they are able to be disposed of directly together with the pre-products of paper. In this case, the local arrangement of the adhesive strips as claimed in the invention is to be given particular attention such that the outside pre-products are not impaired disadvantageously with regard to print/read regions.

The adhesive strip is realized in particular in an elongated manner and has a constant width. As a result, it can be simply pulled off a roll and assembled for the application. The elongated form makes it possible—if the adhesive strip is applied with its longitudinal direction at right angles with respect to the stack edge—to overlap the outer pre-products in a sufficiently deep manner, at the same time using a small amount of material, which plays a considerable role in particular where there are large quantities within the million range in the printed product stacks.

A further preferred embodiment of the invention uses adhesive strips which have a multi-layered structure. In this case it is possible for the adhesive strip to be applied per se in a double-layered or multi-layered manner to the collection, or also for the respective adhesive strip portions to be removed from a support material at the desired length and applied to the collection. Within the framework of multi-layeredness, particular requirements for specific collections can also be taken into account. Thus it is possible to combine a tear-resistant layer with a highly printable layer or, for example, to apply a separately removable layer together with a carrier layer. The removable layer, in this case, can additionally fulfill particular tasks such as, for example, serving as a medium for publicity content or also information content (e.g. codes or color identification).

It is, however, conceivable for the adhesive strip to have a width which changes over the length, in particular a narrowing in a central region. Such a narrowing can save on tape material on the one hand and on the other hand, a correspondingly formed narrowing in place of a perforation can facilitate the subsequent separation of the adhesive strip when the stack is taken apart. All possible corners on the outside of the adhesive strip should be rounded off on the outside for reducing the risk of unintentional tearing.

The adhesive strip is particularly simple to assemble and mount if it has an adhesive layer continuing in the longitudinal direction because then it does not have to be adjusted to the stack edge. Over and above this, the continuous adhesive layer can also contribute to fixing the central pre-products at the edge in the stack and thus to increasing further the cohesion in the stack or in the collection.

However, it is also conceivable for the adhesive strip to have an adhesive layer which is interrupted in a central portion and/or adhesive-free or non-adhesive end portions in order to avoid adhesion to the central pre-products of the stack and/or to facilitate the subsequent taking apart of the stack. The adhesive-free or non-adhesive end portions enable the adhesive strips to be gripped simply at their ends in order then to pull them away from the stack or the collection.

Another development of the invention is distinguished in that the adhesive strip has a perforation in the center when viewed in the longitudinal direction. The perforation makes it possible to tear the adhesive strip in the center without any aids for taking the stack or the collection apart. The separated halves of the adhesive strip can then simply remain on the outer pre-products and do not have to be removed from the pre-products.

When the adhesive strip as claimed in another development of the invention is prepared by being separated off an adhesive tape, it is advantageous that to facilitate the separation of the adhesive strip from the adhesive tape, the adhesive tape is provided with corresponding notches or incisions at the separating points. As a result, the application process can be accelerated in order to be able to process large quantities.

Another development of the method as claimed in the invention is characterized in that to facilitate the detaching of the connecting element, in each case prior to mounting the connecting element, a separating layer is arranged in the overlapping regions between the connecting element and the outside pre-products of the stack or of the collection. If the separating layer consists, for example, of a glued-on foil with a smooth surface, an applied adhesive strip can be removed easily and residue-free when the stack or the collection is subsequently taken apart. If the separating layer or foil is realized in a colorless and transparent manner, it only impairs the appearance of the respective printed product slightly.

A further development of the invention is distinguished in that for preparing the stack to be assembled or the collection to be assembled, the pre-products are placed one on top of the other or side by side in a predetermined sequence one after the other in a collating apparatus. As a result, a stack or a collection, which can be adapted to the most varied of requirements regarding the structure and number and sequence of the pre-products, is able to be formed in a flexible manner. A suitable collating apparatus is supplied, for example, by the Applicant under the name of "Flystream".

In the collating apparatus, the forming stack or the forming collection is preferably guided past a plurality of supplying conveyors arranged one behind the other, wherein the supplying conveyors supply at least one pre-product in each case to the stack or the collection. If the supplying conveyors are individually actuatable, the stack forming or collection forming can be effected in a particularly flexible manner. Suitable supplying conveyors are provided, for example, by the Applicant under the name of "JedFeeder".

In this case it is conceivable for the stacks or collections to be provided in each case with the at least one connecting element in an application apparatus at the end of the collating apparatus, as a result of which a particularly compact arrangement is produced.

In the application apparatus an adhesive tape is preferably unrolled from an adhesive tape roll, an adhesive strip is cut off the unrolled adhesive tape and the cut adhesive strip is mounted on the stack guided past or on the collection guided past.

The application is effected in a particularly simple manner when the stack or the collection is conveyed through the application apparatus with the selected stack edge in front, and when the cut adhesive strip is held in readiness at right angles with respect to the conveying direction of the stack or of the collection with one adhesive side oriented against the conveying direction of the stack or the collection in such a manner that the stack or the collection, during (its) conveying through the application apparatus, contacts and entrains the adhesive strip held in readiness by way of the selected stack edge in the center. It goes without saying in this case that the aligning of the adhesive strip is effected such that any possible perforations or adhesive-free portions are located in the region of the stack edge.

As claimed in a further development, guide elements, which press the adhesive strip picked up by the stack or the collection in an overlapping manner against the two outside pre-products of the stack or of the collection, are provided in the application apparatus. As a result, it is ensured in a simple manner that the adhesive strip abuts in an adhesive manner against the outer pre-products of the stack moved past or of the collection moved past and ensures the desired cohesion of the stack or of the collection.

However, it is also conceivable for the stacks or collections to be conveyed in a conveying apparatus, held in clamps, through a stack connecting apparatus, and to be provided in each case with the at least one connecting element in the stack connecting apparatus. In this way, the assembling of the stacks or of the collections can be easily incorporated into an existing larger system.

The composition as claimed in the invention in the form of a stack consisting of single-layered or multi-layered pre-products that lie freely one on top of the other or a collection consisting of single-layered or multi-layered pre-products that lie freely side by side, in particular printed products, of the same or a different size, which stack or which collection has two pre-products lying on the outside, is characterized in that to achieve a cohesion of the pre-products to facilitate the subsequent handling, at least one connecting element is mounted on the stack or the collection in such a manner that it overlaps the two outside pre-products of the stack or of the collection in an adhesive manner. The term single-layered or multi-layered pre-products, in this case, also refer to single page or multiple page pre-products.

A development of the composition as claimed in the invention is characterized in that the at least one connecting element overlaps the two outside pre-products of the stack or of the collection in an adhesive manner in each case on the outside.

As an alternative to this, the at least one connecting element, however, can overlap the two outside pre-products of the stack or of the collection in an adhesive manner in each case on the inside such that the overlap region is not outwardly visible.

Another development of the composition is characterized in that the pre-products of the stack or of the collection have in each case at least one preferred edge, that the pre-products of the stack or of the collection are arranged and aligned in the stack or in the collection such that the preferred edges of the pre-products together form at least one stack edge, and that the at least one connecting element is mounted on said stack edge.

In particular, several connecting elements can be mounted longitudinally of the selected stack edge on the stack or on the collection overlapping the two outside pre-products of the stack or of the collection.

It is, however, also conceivable for several connecting elements to be mounted on several selected stack edges on the stack or the collection overlapping the two outside pre-products of the stack or of the collection.

As claimed in a preferred development of the invention, the connecting element is an adhesive strip.

The adhesive strip is preferably realized in an elongated manner.

In particular, the adhesive strip has a constant width. It is, however, also conceivable for the adhesive strip to have a width which changes over the length, in particular a narrowing in a central region. To reduce the risk of unintentional tearing, rounded edge regions or corners should be provided on the outside of the adhesive strip.

As claimed in another development, the adhesive strip has an adhesive layer continuing in the longitudinal direction.

To simplify the dismantling of the composition, it can be advantageous when the adhesive strip has an adhesive layer which is interrupted in a central portion and/or adhesive-free or non-adhesive end portions.

However, it can also be advantageous when the adhesive strip has a perforation in the center when viewed in the longitudinal direction.

A further development is distinguished in that to facilitate detaching the connecting element a separating layer is arranged in each case in the overlapping regions between the connecting element and the outside pre-products of the stack or of the collection.

The applicator as claimed in the invention for producing a composition as claimed in the invention is characterized in that the applicator has at least two pressing flanks which each act on a side face of the composition in a non-positive manner and that the applicator has a free region between the pressing flanks, wherein the applicator serves for applying at least one adhesive strip and the free region during said applying operation corresponds at least approximately to the height of the composition.

A development of the applicator as claimed in the invention is distinguished in that the pressing flanks are realized as lateral pressing faces, for example in the form of correspondingly curved guide plates, with regard to which the composition is moved and has a relative speed. The pressing faces, which are preferably arranged in a stationary manner, abut and press the adhesive strip against the outside faces of the composition moved past. In an alternative embodiment, the pressing faces, which are arranged in a stationary manner, can be anti-friction, which can be achieved, for example, by a rolling face or a corresponding coating which reduces the sliding friction.

However, it is also conceivable for the pressing flanks to be realized as circulating belts which convey the composition between them. As a result, the conveying of the composition through the apparatus and the application of the adhesive strip or strips are combined together in a particularly simple manner. In place of belts, however, correspondingly spaced pairs of actively conveying rollers can also be used, the composition being guided between said rollers.

In a further preferred embodiment, the applicator is characterized in that at least one pressing face or rolling face is spatially moveable in relation to said composition in the direction of the face of the composition and can be pushed in over one edge of the composition such that at least one adhesive strip is applied on said edge or on the outside pre-products.

The stacks or collections formed in this manner are greatly advantageous in particular in the case of high speed processes (processing in the order of magnitude of five, ten or more products per second) or in the case of complicatedly formed stacks, namely if a precise mutual alignment of the pre-products is significant during the further processing or if, during a further processing step, the unwanted possibility of the pre-products of a collection becoming "mixed" with those of other collections or there is a situation where the re-separation of collections lying side by side is problematic.

Precisely when a precise mutual alignment of the pre-products is desired for the further processing of the pre-products or of the collection, the present solution as claimed in the invention can be supplemented or combined with an additional adhesive connection between the pre-products themselves. A preferred solution of the named type is produced from the filing on the same day as the present application by the same Applicant with the title, "Method for assembling a stack or a collection consisting of single-layered or multi-layered pre-products that lie freely one on top of the other and compositions of such pre-products" now U.S. Pat. No. 9,511,613, to which reference is hereby integrally made.

BRIEF DESCRIPTION OF THE DRAWINGS

The invention is to be explained below by way of exemplary embodiments in conjunction with the drawings, in which, in detail:

FIG. 5 shows different forms of adhesive strips or connecting elements for the method as claimed in the invention, represented side by side from left to right;

FIG. 6A shows a perspective view of a representation comparable to FIG. 2 of a stack with two identical type adhesive strips which are spaced apart from one another and have a narrowing in the central region;

FIG. 6B shows an enlarged detail view of FIG. 6A.

FIG. 7 shows a perspective view of a stack of pre-products collected in a holder, said stack having been provided with an adhesive strip in the holder;

FIG. 16 shows the forming of a pocket for inserting the remaining pre-products according to another exemplary embodiment of the invention;

FIG. 17 shows the insertion of the remaining pre-products into the pocket formed according to FIG. 16 and consisting of the outside pre-products; and FIG. 18 shows a stack according to one exemplary embodiment of the invention with an adhesive strip which completely overlaps the top pre-product of the stack and is bonded on an inside of the top pre-product with a folded-in end portion.

DETAILED DESCRIPTION OF THE INVENTION

Figure 9:
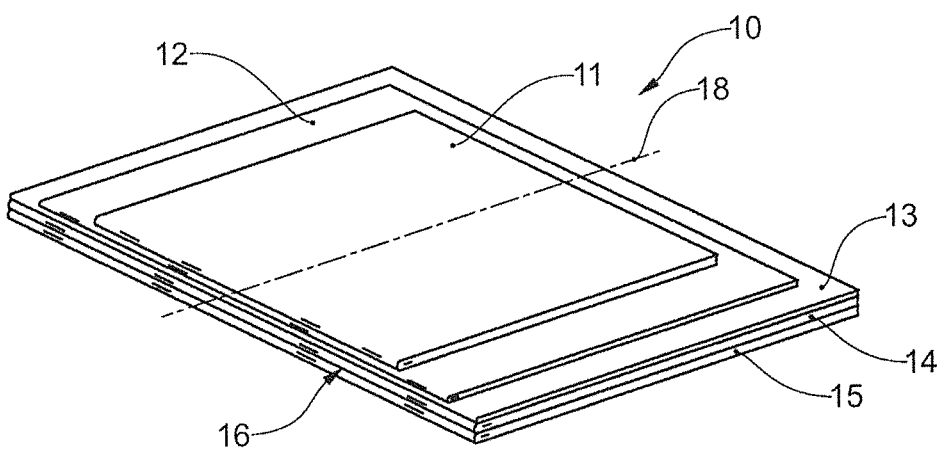
FIG. 9 shows the non-bonded stack consisting of pre-products according to FIG. 1.

The method as claimed in the invention proceeds from a stack of pre-products, as is shown in a perspective view in FIG. 9. The stack 10, in this example, includes a total of five pre-products 11, 12, 13, 14 and 15. In the example, all the pre-products 11-15 of the stack 10 have a folded edge and are stitched on the folded edge. The pre-products can be printed products, for example. It goes without saying that within the framework of the invention the pre-products can also have a different make-up, function, shape and mutual arrangement.

In the following explanations of the exemplary embodiments, the talk will always be of stacks, the pre-products having been piled up to form said stacks. The term stacks, in this case, refers to compositions of pre-products which lie one on top of another and are initially held together by the force of gravity. If the compositions are not arranged lying one on top of another, but are realized lying side by side in a different spatial orientation, e.g. aligned vertically, they are described in general as collections. The invention relates to both types of compositions of pre-products.

The pre-products 11-15 lie in the stack 10 one on top of another as claimed in the invention such that their folded edges form a common stack edge 16 of the stack 10. The pre-products 11-15, which can be advertising leaflets, flyers, but also product samples, CDs or the like, are of different sizes in the example shown. The top printed product 11 in FIG. 9 is clearly smaller than the printed product 12 lying beneath it and even smaller than the further pre-products 13-15. The pre-products 11 and 15 are the outside pre-products of the stack 10. They play a particular role for the method as claimed in the invention. All the pre-products 11-15 are preferably arranged in the stack 10 such that they lie symmetrically with respect to a common center line 18. The sum of the pre-products 11 to 15 forms (in the compressed state) the height of the stack or of the composition.

Figure 1:
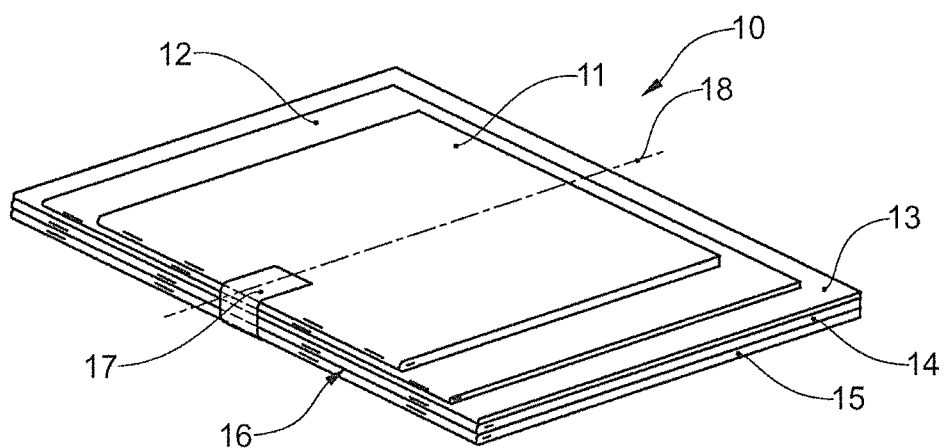
FIG. 1 shows a perspective view of a stack with several variously sized pre-products, said stack being provided according to one exemplary embodiment of the invention with an adhesive strip on a stack edge.

Now according to FIG. 1, in the simplest case the cohesion of the stack 10, which is otherwise determined only by the weight of the pre-products and the friction between the pre-products, is considerably improved by an adhesive strip 17 as the connecting element being bonded over the stack edge 16 of the stack 10 such that it overlaps the two outside pre-products 11 and 15 in an adhesive manner on their outside. By applying the adhesive strip 17, the two outside pre-products 11 and 15 form, as it were, a pocket in which the remaining (inside) pre-products 12-14 lie. If an adhesive strip 17 with a continuous adhesive layer is used, additional fixing can be achieved by the adhesive strip also bonding at least lightly on the folded edges of the inside pre-products 12-14.

Figure 2:
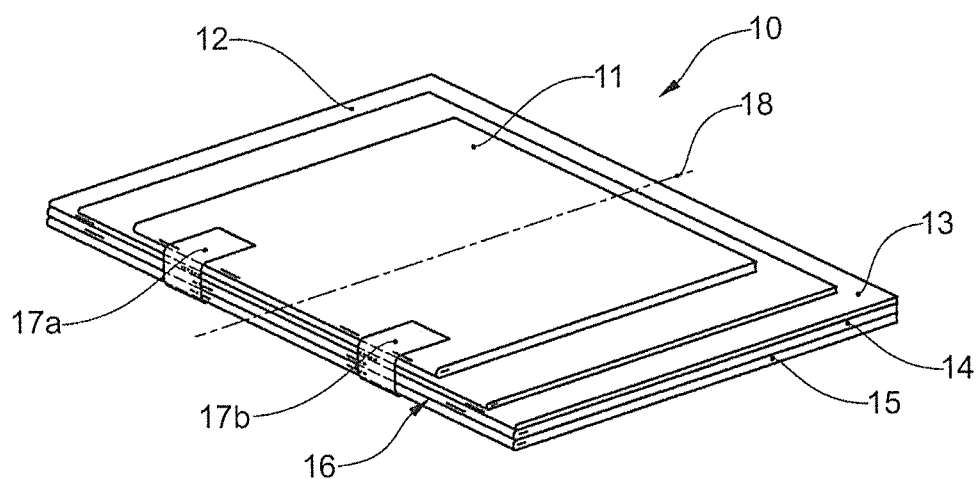
FIG. 2 shows the stack from FIG. 1, which according to another exemplary embodiment of the invention is provided with two identical type adhesive strips spaced apart from one another on the same stack edge.

If—as shown in FIG. 1—only one single adhesive strip 17 is used for the connection, it is advantageous when said strip is placed precisely in the center line 18 of the stack 10. If—as shown in FIG. 2—two adhesive strips 17a and 17b are mounted side by side on the stack edge, this preferably occurs symmetrically with respect to the center line 18 of the stack. In this case, it is advantageous for the stability of the stack when the adhesive strips 17a and 17b are placed as wide as possible apart.

In principle, it would be conceivable to provide further adhesive strips on other edges in addition to one or several adhesive strips 17 or 17a, b on the stack edge 16, which, however, in the case of the stack 10 shown in FIGS. 1 and 2, would cause problems due to the pre-products being of different sizes. Over and above this, the mounting of additional lateral adhesive strips requires considerable expenditure on hardware without resulting in decisive advantages. If the stack 10', as shown in FIG. 3, consists of identically sized pre-products 11', 15', it is easier to mount additional adhesive strips on other stack edges.

Figure 3:
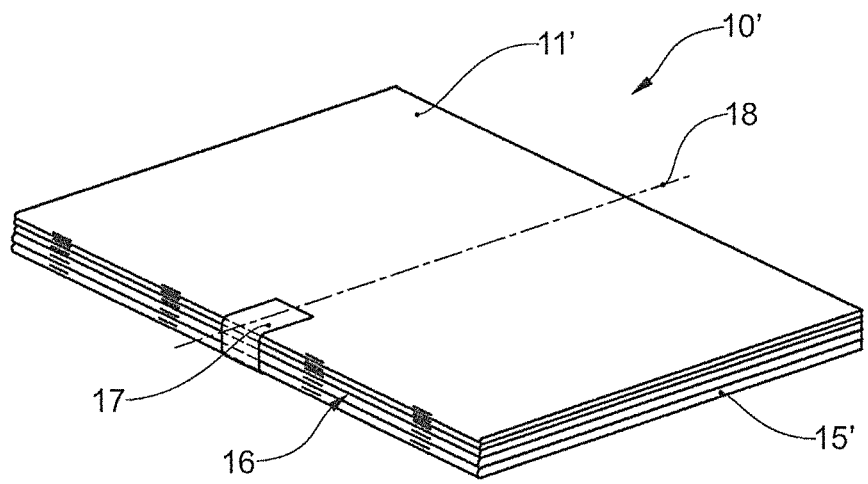
FIG. 3 shows a stack consisting of identically sized but variously thick pre-products, said stack, according to a further exemplary embodiment of the invention, being provided with one adhesive strip as in FIG. 1.
Figure 4:
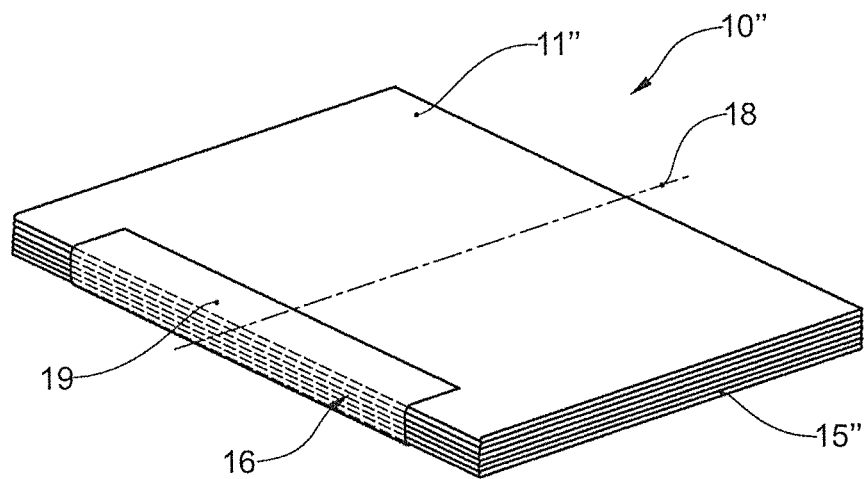
FIG. 4 shows a stack consisting of identically sized and identically thick pre-products, said stack, according to another exemplary embodiment of the invention, being held together with one adhesive strip extending in the direction of the edge.

The exemplary embodiment of FIG. 4, where a stack 10" with identically sized pre-products 11", 15" is also presupposed, differs from the exemplary embodiments of FIGS. 1-3 in that, in this case, an adhesive strip 19 is applied on the stack edge 16 in the direction of the edge. This type of arrangement of the adhesive strip 19 produces increased cohesion in relation to the arrangement from FIG. 1, however it does make the precise mounting and subsequent dismantling of the stack 10" difficult. In all cases, however, the adhesive strip 17 or 17a, b or 19 overlaps the two outside pre-products 11, 15 or 11', 15' or 11", 15".

FIG. 5 shows the top view of different types of connecting elements or adhesive strips which are shown side by side from left to right. The adhesive strip 17 on the far left has a simple elongated, rectangular form (with a constant width) and is in principle provided with a continuous adhesive layer. However, it can have adhesive-free or non-adhesive (e.g. covered on the inside by a foil portion) end portions 22a, 22b, which are easier to grip when removing the adhesive strip. The next adhesive strip 17' to the right has the same basic form, but has a central portion 22 (shaded in grey in FIG. 5), in which there is no adhesive layer. This can prevent the adhesive strip 17' bonding fixedly to the central pre-products (12-14 in FIG. 1) and thus making the dismantling of the stack difficult. A further adhesive strip 17" in FIG. 5 has a perforation in the center which makes it possible to separate off the adhesive strip at this position without using any aids and thus means that it is easier to dismantle the stack bonded therewith. In the case of particular embodiments, the adhesive characteristics of the end portions 22*a*, 22*b* and/or of the central portion 22 are preferably varied in a targeted manner.

In particular also in order to optimize the detachment of the adhesive strip from the outside pre-products, the end portions can have face regions with more or less adhesive force such that different adhesive characteristics can be influenced in a targeted manner. For this purpose, the adhesive force can decrease continuously from the two lateral edges of the adhesive strip toward the center region or only the outside edges of the end portions 22*a*, 22*b* can be realized in a strongly adhesive manner. As the adhesive strips 17 are acted upon beforehand with tensile force where collections are used, in the case of preferred embodiments an easily peelable adhesive can be used which minimizes or avoids damage to the outside pre-products when peeled off and in this case nevertheless ensures a sufficient frictional connection when the collections are handled.

It is, however, also conceivable for the adhesive strips 49*a*, 49*b* according to FIG. 6 to have a width which alters over the length, in particular a narrowing 50 in a center region. Such a narrowing 50 (FIG. 6(*b*)) can on the one hand save on tape material. On the other hand, a correspondingly shaped narrowing in place of a perforation can simplify the subsequent removal of the adhesive strip when the stack is taken apart. If unintentional tearing of the adhesive strip is to be made more difficult or prevented, it is advantageous to round off outside corners or edge regions in order to avoid any notch effects linked thereto.

If the adhesive strips are separated off an adhesive tape 20 which is rolled, for example, on a roll (see the 4$^{th}$ and 5$^{th}$ example from the left in FIG. 5; see also the adhesive tape toll 51 in FIG. 13), the separation process can be made easier in contrast by notches 25 or incisions 26 correspondingly provided on the adhesive tape 20. If a perforation 23 is provided in addition, the position of the notches 25 or incisions 26 on the adhesive tape 20 has to be matched to the perforation 23 there.

As carrier material the adhesive strips 17, 17', 17" or 17*a, b* and 19 can have a paper or a plastic foil or a plastic film which are provided with an adhesive layer at least on one side in the provided regions or completely (continuously). The plastic foil or the plastic film can be transparent and clear in order to be as inconspicuous as possible on the stack and not to the disturb the overall impression. However, they can also be colored or for advertising or information purposes can be provided with an inscription or images. In further applications, the adhesive strips can be used as information carriers. The information can consist of color or digital codes or, however, can include other optically or electronically readable information. It is also conceivable to provide fibrous reinforcements in the adhesive strips, or recesses and punch outs. Along with the possibility of applying said advertising or information content onto the adhesive strips (print, mechanical coding etc.), where the adhesive strips have a multi-layered design the advertising or information carrier can also be inserted between the layers. Said insertion of an advertising or information carrier can be undertaken in a permanent manner or also so as to be detachable or triggerable in a targeted manner.

In addition, as claimed in the invention, the applying, for example, of colored codings has the effect of making a composition visually easy to recognize—even from the outside, which supports operating or distributing personnel in the operating process when handling, in particular, stacks or stands consisting of a plurality of compositions which deviate from one another (in part or completely).

Figure 8:
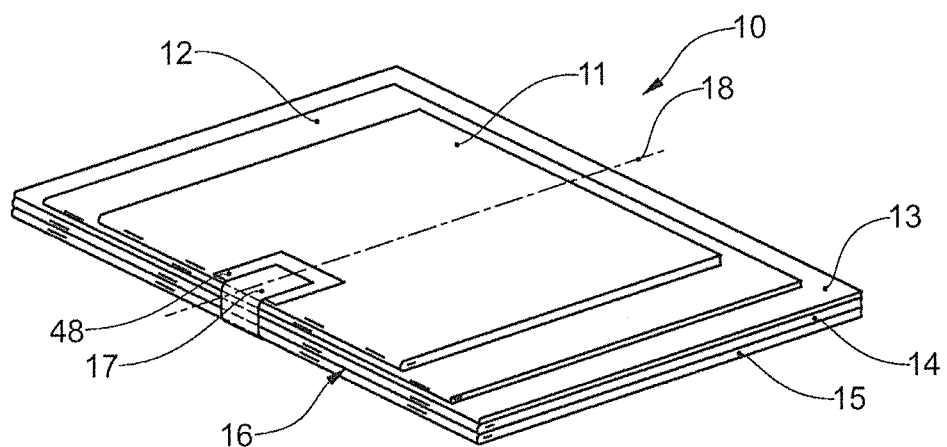
FIG. 8 shows the bonded stack from FIG. 1, wherein, as claimed in a further exemplary embodiment of the invention, a separating layer is arranged in each case under the adhesive strip.

If, according to FIGS. 1-4, an adhesive strip 17, 17*a,b* or 19 is bonded around the stack edge 16 on the outsides of the outside pre-products 11, 15 or 11', 15' or 11", 15", it is possible for the pre-products to become damaged, in particular if the surfaces of the pre-products are not particularly smooth, when the adhesive strip is detached during the dismantling of the stack. In order to avoid this type of damage in a reliable manner when detaching the adhesive strips, the outside pre-products 11, 15, according to FIG. 8, can be provided with a separating layer 48 prior to the adhesive strips 17 being stuck on, from which separating layer the adhesive strips 17 can be detached or removed in an easy and residue-free manner. These types of separating layers 48 can be, for example, self-adhesive plastic foils or films with a smooth surface. Such systems are known from the area of re-closable bags or the like.

The forming of the stacks 10 can be effected, according to FIG. 7, such that the pre-products 11-15 are pushed or thrown one after the other with their folded edge in front into a corresponding (inclined) holder 37 in which they abut on the inside against a corresponding angular strip 38 by way of the folded edges. At the points at which the adhesive strips 17 are to be subsequently applied, recesses 39, which ensure free access from outside to the corresponding portion of the stack edge, are provided on the holder 37.

Figure 11:
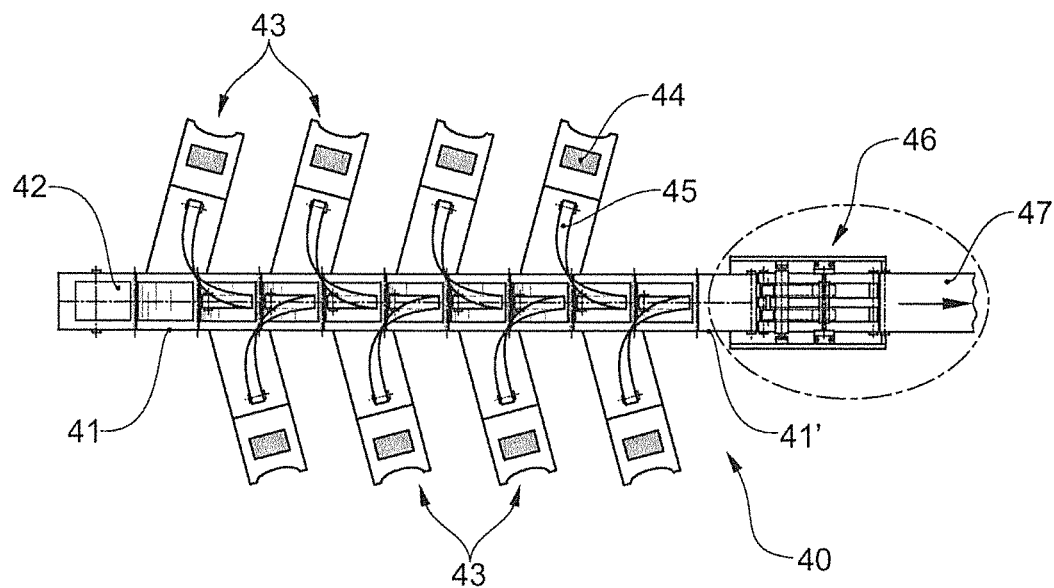
FIG. 11 shows the top view from above of a collating apparatus for preparing and assembling pre-product stacks according to another exemplary embodiment of the invention.

These types of holders 37 can be part of a collating apparatus 40, which is shown in FIG. 11 and includes a circulating conveying means 41 with collecting portions or compartments 42 which are arranged one behind the other thereon in the conveying direction and into which pre-products, which are held in each case in a storage shaft 44 in the supplying conveyors 43, are introduced via corresponding curved tracks 45 one after the other from supplying conveyors 43 which are set up at the side of the conveying means 41. The pre-products to be placed in the stack can be selected and supplied to the stack by actuating the supplying conveyors 43 in a corresponding manner. By running around the collecting portions 42 several times, the sequence of the pre-products in the stack can be changed or a missing printed product supplemented. The finished collected stacks are then transferred to a following application apparatus (applicator) 46 by means of a further conveying means 41' and are there provided with the connecting elements or adhesive strips and finally are output to a stack outlet 47.

Figure 12:
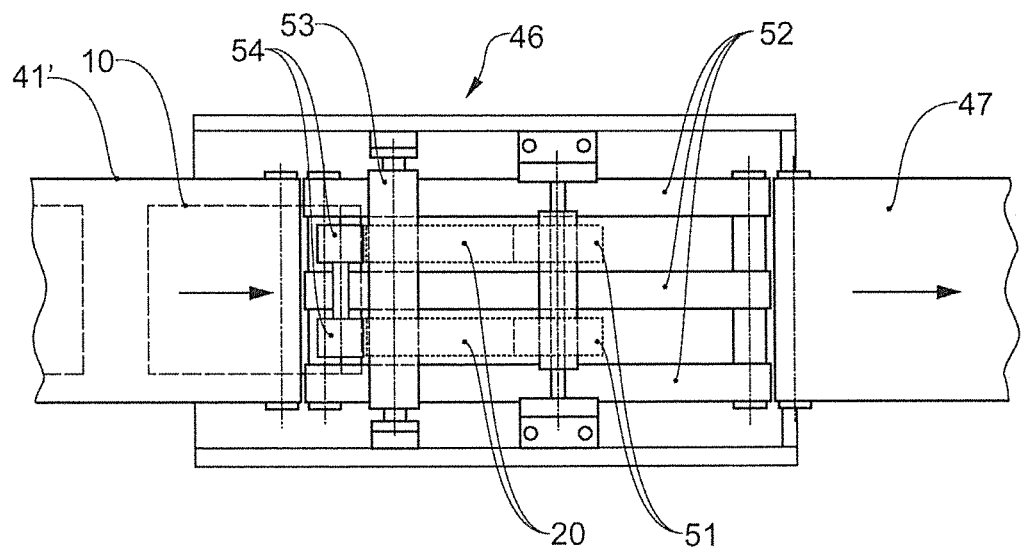
FIG. 12 shows an enlarged detail of the application apparatus from the collating apparatus of FIG. 11.
Figure 13A:
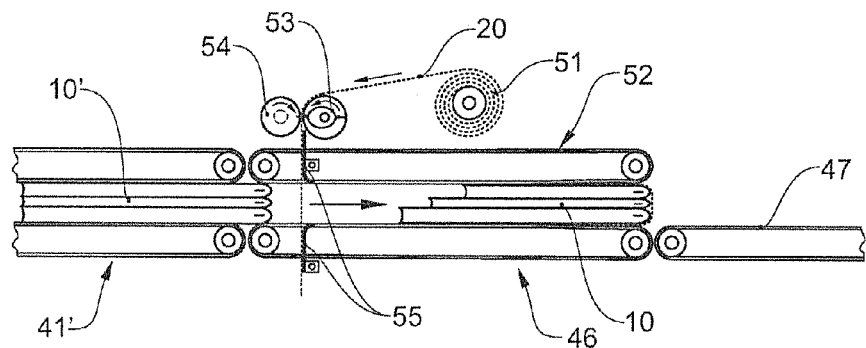
FIG. 13A shows a side view of a step in the process of applying the adhesive strips in the application apparatus from FIG. 12.
Figure 13B:
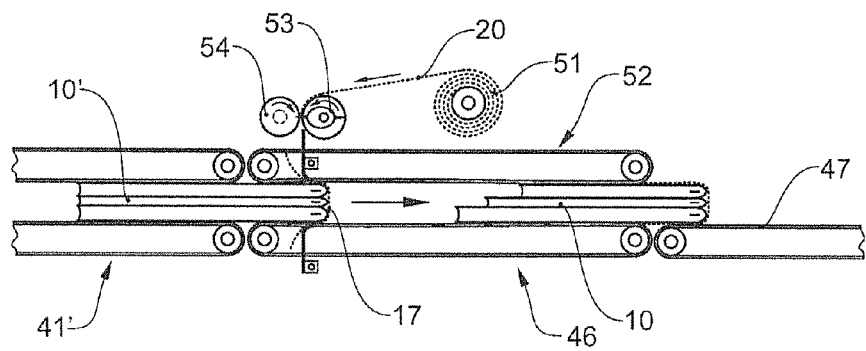
FIG. 13B shows a side view of a following step in the process shown in FIG. 13A.
Figure 13C:
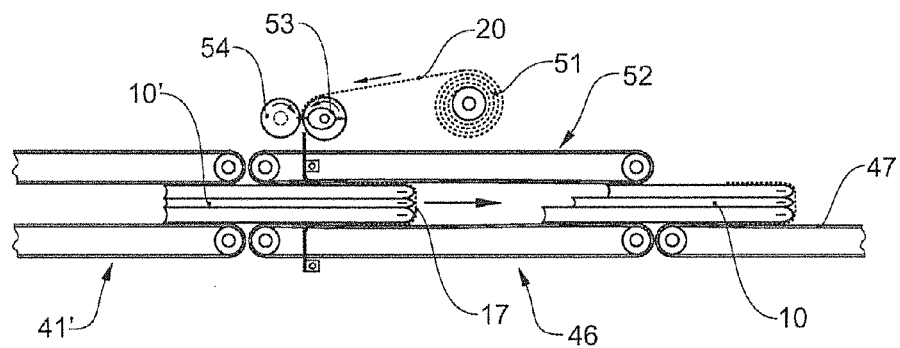
FIG. 13C shows a side view of a following step in the process shown in FIG. 13B.

FIG. 12 shows a top view from above of the enlarged detail from FIG. 11 (oval shown by the dot-dash line) which includes the application apparatus or the applicator 46. FIG. 13 shows a side view of different steps when applying the adhesive strips in the application apparatus or the applicator 46 from FIG. 12. In the example shown, the stacks 10 or 10' delivered by the collating apparatus 40 or the conveying means 41' are provided, according to FIG. 2, with two adhesive strips 17*a* and 17*b* which are spaced apart from one another. To this end, in each case a corresponding adhesive tape 20 is rolled off by a predetermined amount from a prepared adhesive tape roll 51 (FIG. 13(*a*)). The rolled-off adhesive tape 20 is guided through between a (driven) roller-shaped, rotating cutting apparatus 53 and an associated counter roller 54, forming together in said embodiment the adhesive tape feed of the applicator as claimed in the invention, and as a result is moved forward. When the adhesive tape 20 has been rolled off to a predetermined length, the rotating cutting apparatus 53 cuts off a corresponding portion of the adhesive tape 20 at the same time.

The cutting step is coordinated in time with the conveying of the stacks 10 or 10' through the application apparatus 46. The stacks 10, 10' are conveyed, in FIG. 13 from left to right, initially between two belts of the conveying means 41' and then are transferred to a conveying apparatus 52 which also has two parallel belts. When the stack 10, 10' conveyed by the conveying apparatus 46 reaches, by way of its (front) stack edge, the adhesive strip 17 held in readiness at right angles with respect to the conveying direction, said adhesive strip is at the same time cut off from the adhesive tape 20. The cut-off adhesive strip 17 is then, as can be seen in FIG. 13(*b*), entrained by the stack 10'. Two baffle plates 55, which are arranged above and below the conveying path of the stacks 10, 10' and along which the adhesive tape 20 is also guided vertically, are responsible through correspondingly curved, inside ends (and where applicable elongated following faces) which act as pressing flanks and influence the side faces of the stacks or compositions 10, 10' in a friction-locked manner, for the entrained adhesive strip 17 abutting against the outsides of the stack in an adhesive manner as the stack 10' moves between the baffle plates 55 (FIGS. 13(*b*) and (*c*)). In order to reduce the sliding friction, in the case of preferred embodiments, the pressing flanks (or pressing faces), which are arranged in a stationary manner, can be antifriction. To this end, a coating which reduces the sliding friction is used or rolling faces are used. Between the two baffle plates 55 arranged one above the other there is, for this purpose, a free region which approximately corresponds to the height of the compositions or the stack height of the stacks 10, 10'. The baffle plates 55—as other strip-guiding components—can also incidentally have a slightly curved profile at right angles with respect to the conveying direction in order to stabilize the strips in form and position during the conveying or the application. In this way, the adhesive strips, by way of their non-adhesive side, in a preferred manner follow in the conveying direction the surface lines of a cylinder which then merges into flat pressing flanks. The stacks 10, 10' provided with the adhesive strips 17 are finally output via the stack outlet 47.

The pressing flanks, however,—similar to the belts of the conveying apparatus 52—can also be realized as circulating belts which convey the compositions or stacks 10, 10' between them and at the same time place the adhesive strips about the stack edge. However, in place of belts it is also possible to use pairs of rollers which are correspondingly dimensioned, spaced apart and actively convey the compositions or stacks 10.

In the exemplary embodiment of the applicator 46 shown in FIG. 13, the lateral pressing faces of the baffle plate 55 are at rest (stationary) whilst the stacks 10, 10' are being moved or conveyed in relation thereto through the applicator 46. However, it is also conceivable to allow the stacks 10, 10' to rest (or to move the stacks substantially at right angles with respect to their lateral faces) and to move the pressing faces with the adhesive strip along the stack in order to apply the adhesive strip. For this purpose, the (moved) pressing faces or as an alternative to this also the rolling flanks, in a preferred manner with the adhesive strip to be applied, can be pushed in the direction of the face of the stacks over the aligned stack edges of the pre-products such that the adhesive strip is applied on said edges or on the outside pre-products.

Figure 10:
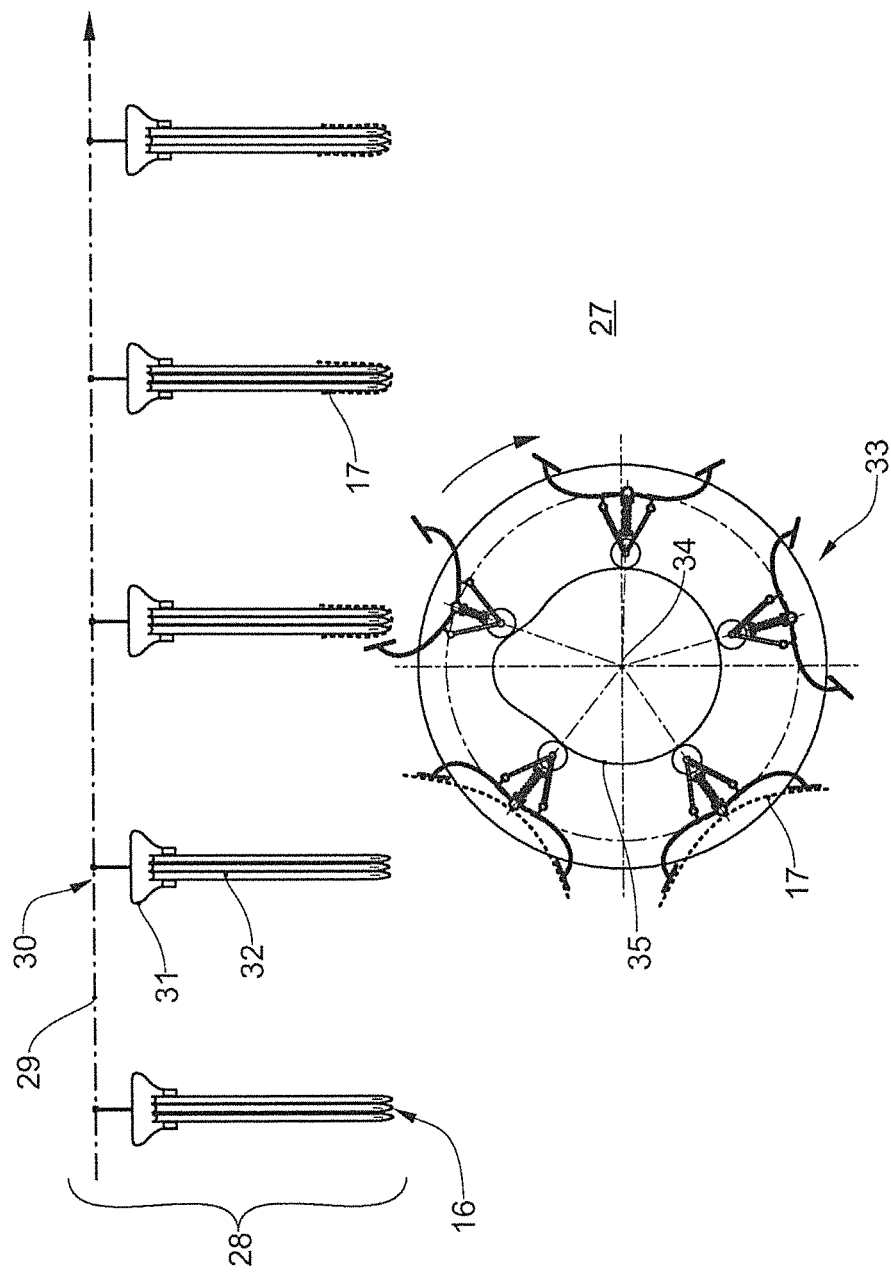
FIG. 10 shows a side view of the principle design of a stack connecting apparatus for applying adhesive strips according to another exemplary embodiment of the invention.

However, it is also conceivable, according to the schematic representation in FIG. 10, to convey the finished stacks 32 by means of a conveying apparatus 28, held in clamps 31 or grippers, through a stack connecting apparatus 27, where they are provided with adhesive strips 17 by an application apparatus 33 which rotates synchronously about an axis of rotation 34. The stacks 32, in this case, are held by holding apparatuses 30, which are provided with clamps 31 and are arranged on a carrier belt 29 at regular spacings one behind the other in the conveying direction. Strip applicators 36, which, by means of a corresponding motion link 35, pick up the prepared adhesive strips 17 in a controlled manner and apply them to the stack edges 16 of the stacks 32 guided past, are arranged in the application apparatus 33 running around the axis of rotation 34. In the embodiment shown in FIG. 10, the collections are suspended with the stack edge 16 suspended freely downward. The adhesive strips 17, in this case, are applied to the free (suspended) edge which, where required, can also be stabilized by an auxiliary apparatus (e.g. a guide bar which is not shown in any more detail here or entrained support or clamping elements, such as are previously known in the prior art). It is naturally possible, and in the case of different conditions also particularly preferred, to arrange the applicator 33 (under some circumstances even laterally or above the conveying apparatus 28) such that the adhesive strips are applied on the top edges which are held by the clamps 31. Said solution is consequently particularly advantageous because the pre-products of the respective collection are already held together or pressed together on the side held by the clamps 31 and, as a result, the compression of the stack edges 16 desired for applying the adhesive strips is provided.

In an analogous manner, it is possible to convey the collections such that the adhesive strips 17 are applied on a lateral edge.

In addition, it is preferred as claimed in the invention for the applicator 46 to have at least one pressing face or rolling face (expediently two of them) which is spatially movable in the direction of the face of the composition in relation to said composition and is insertable over an edge of the composition. For this purpose, the compositions can be stabilized at their lateral faces (for example by baffle plates or clamps—assigned in a permanent or temporary manner). Analogously to FIG. 10, the pressing or rolling face, coming from below, would be inserted in this way in a corresponding manner (inclinedly) over the suspended compositions. One or several adhesive strips can be applied on the outside pre-products in this manner in the region of the stack edge which in this case lies below. Obviously, said operation can also be performed in a simpler manner on (temporarily) stationary products.

Figure 14:
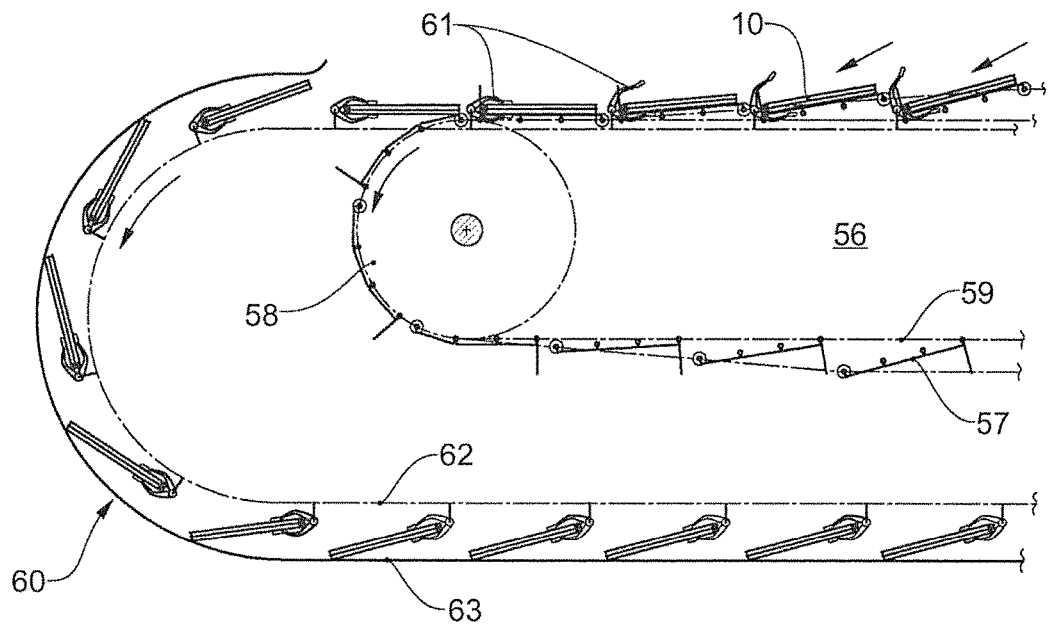
FIG. 14 shows a possibility for conveying the stacks formed in a collating apparatus to an application apparatus situated at another location.

Whilst in the case of the exemplary embodiment of FIG. 11, the collated stacks consisting of the pre-products are provided with the desired adhesive strips 17 in the following application apparatus 46 directly after the collating process, it is also possible to carry out the collating and the applying of the adhesive strips at different locations. As is shown as an example in FIG. 14, in a collating apparatus 56 in which a plurality of compartments 57 circulate on a circulating track 59 and are guided by means of a guide roller 58, the stacks 10 are collated there and, prior to being guided at the guide roller 58, are taken over by a conveying apparatus 60, which is guided parallel to the collating apparatus 56 prior to the guide roller 58 and, by means of corresponding grippers 61, removes the collated stacks 10 out of the compartments 57 of the collating apparatus 56 and conveys them along a conveying path 62 to an application apparatus located at a different location. A baffle plate 63, in this case, is responsible for guiding the stacks 10 held in the grippers 61.

Figure 15:
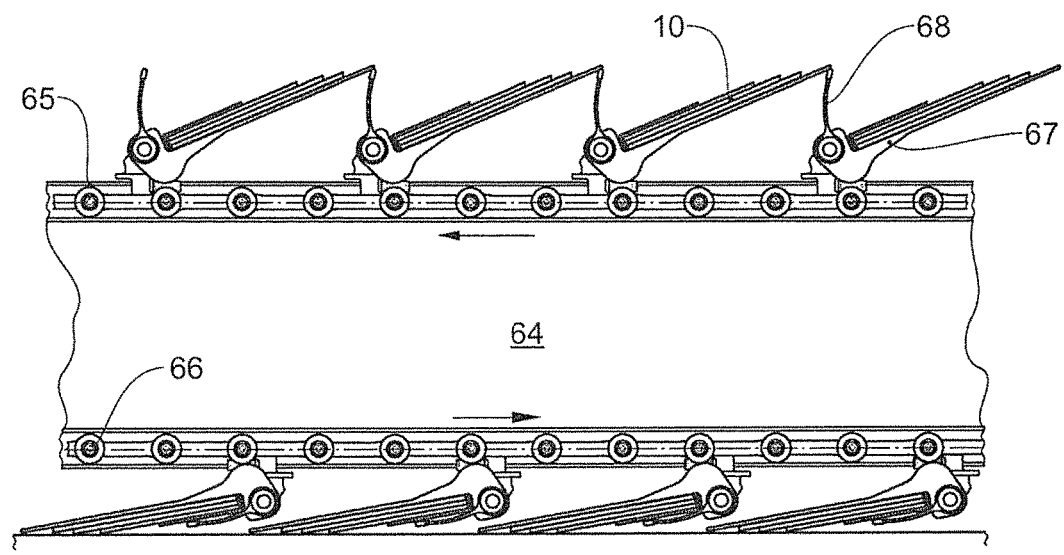
FIG. 15 shows a further possibility for conveying the formed stacks.

However, the collating and further conveying of the collated stacks 10 can also be realized, according to FIG. 15, by means of one single (circulating) conveying apparatus 64 which has a plurality of inclined platforms 67, on each of the bottom ends of which pivotable gripping portions 68 are arranged. On a top run 65 of the conveying apparatus 64, the gripping portions 68 are pivoted back such that the stacks 10 are able to be collated in an unobstructed manner on the platforms 67. The gripping portions 68 are then pivoted into the closed position and then, in a clamping manner, hold the collated stacks which can be conveyed further on the bottom run 66.

In the explanations made up to now, it has been assumed that the complete stack or the complete collection has been prepared first of all out of the pre-products in order to be provided then with the connecting elements or adhesive strips. However, another method of operation which is represented in FIGS. 16 and 17 is also conceivable.

In the case of said method of operation, a type of pocket is formed first of all from the subsequent outside pre-products 11 and 15 by the two pre-products 11, 15 being stacked with the preferred edges offset by the spacing A and then themselves being connected together—as shown in FIG. 16—by means of two connecting elements or adhesive strips 17a and 17b. In dependence on the closing direction of the pocket formed in such a manner, the adhesive strip 17a and 17b surrounds the two outside pre-products 11 and 15 or connects them in an adhesive manner from their inside such that the further pre-products are able to be inserted into the pocket in a corresponding manner.

According to FIG. 17, the pocked formed in this manner can be opened, the two pre-products 11 and 15 assuming a spacing A with respect to one another. The remaining pre-products 12-14 are then able to be inserted into the pocket opened in such a manner in order to form a finished stack or a finished collection. The remaining pre-products 12-14 then abut by way of their preferred edges against the inside of the adhesive strips 17a and 17b. The remaining pre-products 12-14, in this case, can be inserted individually one after the other or in a common bundle.

Finally, FIG. 18 shows a stack as claimed in an exemplary embodiment of the invention with an adhesive strip 17, which completely overlaps the top pre-product of the stack and, by way of a folded end portion, is bonded on an inside of the top pre-product. This type of adhesion can obviously also be realized on the underside of the stack.

The invention claimed is:

1. An applicator (46) for producing a composition in the form of a stack or a collection including single-layered or multi-layered pre-products (11-15; 11', 15'; 11", 15"), in a stack, that lie freely one on top of an other or a collection consisting of single-layered or multi-layered pre-products (11-15; 11', 15'; 11", 15") that lie freely side by side of a same or a different size, the stack (10, 10', 10"; 32) or the collection having two pre-products (11, 15; 11', 15'; 11", 15") each lying on an outside, wherein the applicator (46) comprises:
  two parallel conveying belts defining a conveying path there between for the composition, each of the belts acting on one of opposing outside side faces of the composition;
  at least two pressing flanks (55) each acting on one of the outside side faces of the composition (10, 10', 10"; 32) in a non-positive manner; and
  a free region between the pressing flanks (55);
  wherein the applicator (46) is adapted to apply at least one adhesive strip (17; 17a, 17b) as the composition is moved with a relative speed by the belts between the pressing flanks, the free region during the application corresponds at least approximately to a height of the composition (10, 10', 10"; 32), and the pressing flanks include lateral pressing faces (55) or rolling faces to apply at least one connecting element (17; 17a, 17b; 17'; 17"; 19; 21; 49a, 49b) on the composition to achieve a cohesion of the pre-products to facilitate a subsequent handling, wherein the at least one connecting element (17; 17a, 17b; 17'; 17"; 19; 21; 49a, 49b) overlaps the outside two pre-products (11, 15; 11', 15'; 11", 15") of the composition in an adhesive manner.

2. The applicator as claimed in claim 1, wherein the pre-products comprise printed products.

3. The applicator as claimed in claim 1, wherein several connecting elements are mounted on several selected stack edges on the stack or the collection overlapping the two outside pre-products of the stack or of the collection.

4. The applicator as claimed in claim 1, wherein the at least one connecting element (17; 17a, 17b; 17'; 17"; 19; 21; 49a, 49b) overlaps the two outside pre-products (11, 15; 11', 15'; 11", 15") of the stack (10, 10', 10"; 32) or of the collection in an adhesive manner in each case on the inside.

5. The applicator as claimed in claim 1, wherein each of the pre-products (11-15; 11', 15'; 11", 15") of the stack (10, 10', 10"; 32) or of the collection has at least one preferred edge, the pre-products (11-15; 11', 15'; 11", 15") of the stack (10, 10', 10"; 32) or of the collection are arranged and aligned in the stack (10, 10', 10"; 32) or in the collection with preferred edges of the pre-products (11-15; 11', 15'; 11", 15") together forming a stack edge (16), and in that the at least one connecting element (17; 17a, 17b; 17'; 17"; 19; 21; 49a, 49b) is mounted on the stack edge (16).

6. The applicator as claimed in claim 1, wherein several connecting elements (17a, 17b; 49a, 49b) are mounted longitudinally of the stack edge (16) on the stack (10, 10', 10"; 32) or on the collection overlapping the two outside pre-products (11, 15; 11', 15'; 11", 15") of the stack (10, 10', 10"; 32) or of the collection.

7. The applicator as claimed in claim 1, wherein the connecting element is an adhesive strip (17; 17a, 17b; 17'; 17"; 19; 49a, 49b).

8. The applicator as claimed in claim 7, wherein the adhesive strip (17; 17a, 17b; 17'; 17"; 19; 49a, 49b) comprises an elongated adhesive strip.

9. The applicator as claimed in claim 7, wherein the adhesive strip (17; 17a, 17b; 17'; 17"; 19) has a constant width.

10. The applicator as claimed in claim 7, wherein the adhesive strip (49a, 49b) includes a narrowing (50) in a central region and/or rounded edge regions on an outside to reduce risk of unintentional tearing.

11. The applicator as claimed in claim 7, wherein the adhesive strip (17; 17a, 17b; 17"; 19; 49a, 49b) comprises an adhesive layer continuing in a longitudinal direction.

12. The applicator as claimed in claim 7, wherein the adhesive strip (17') includes an adhesive layer comprising an interruption in a central portion (22) and/or adhesive-free or non-adhesive end portions (22a, b).

13. The applicator as claimed in claim 7, wherein the adhesive strip (17") has a perforation (23) in a center when viewed in a longitudinal direction.

14. The applicator as claimed in claim 1, wherein to facilitate detaching the connecting element (17; 17a, 17b; 17'; 17"; 19; 21; 49a, 49b) a separating layer (48) is arranged in overlapping regions between the connecting element (17; 17a, 17b; 17'; 17"; 19; 21; 49a, 49b) and the outside pre-products (11, 15; 11', 15'; 11", 15") of the stack (10, 10', 10"; 32) or of the collection.

15. The applicator as claimed in claim 1, wherein the pressing flanks comprise circulating belts or actively conveying rollers which convey the composition (10, 10', 10''; 32) there between.

16. The applicator as claimed in claim 1, wherein at least one of the pressing faces (55) or rolling faces is spatially moveable in relation to the composition in a direction of a face of the composition (10, 10', 10''; 32) and is pushed in over one edge of the composition such that the at least one adhesive strip (17; 17a, 17b) is applied on the one edge or on the outside pre-products (11, 15; 11', 15'; 11'', 15'').

17. The applicator as claimed in claim 1, wherein at least two pressing flanks (55) are arranged in a stationary manner relative to the conveying path.

18. The applicator as claimed in claim 1, wherein the composition is transferred by and through the conveying belts to a stack outlet belt.

19. The applicator as claimed in claim 1, wherein lateral pressing faces are stationary and the composition is moved or conveyed in relation thereto through the applicator.

20. The applicator as claimed in claim 1, wherein inside ends of the pressing flanks are curved to form the lateral pressing faces.

\* \* \* \* \*